April 19, 1932. T. H. OPPENHEIM 1,854,599
MANURE SPREADER
Filed Jan. 15, 1930 3 Sheets-Sheet 1
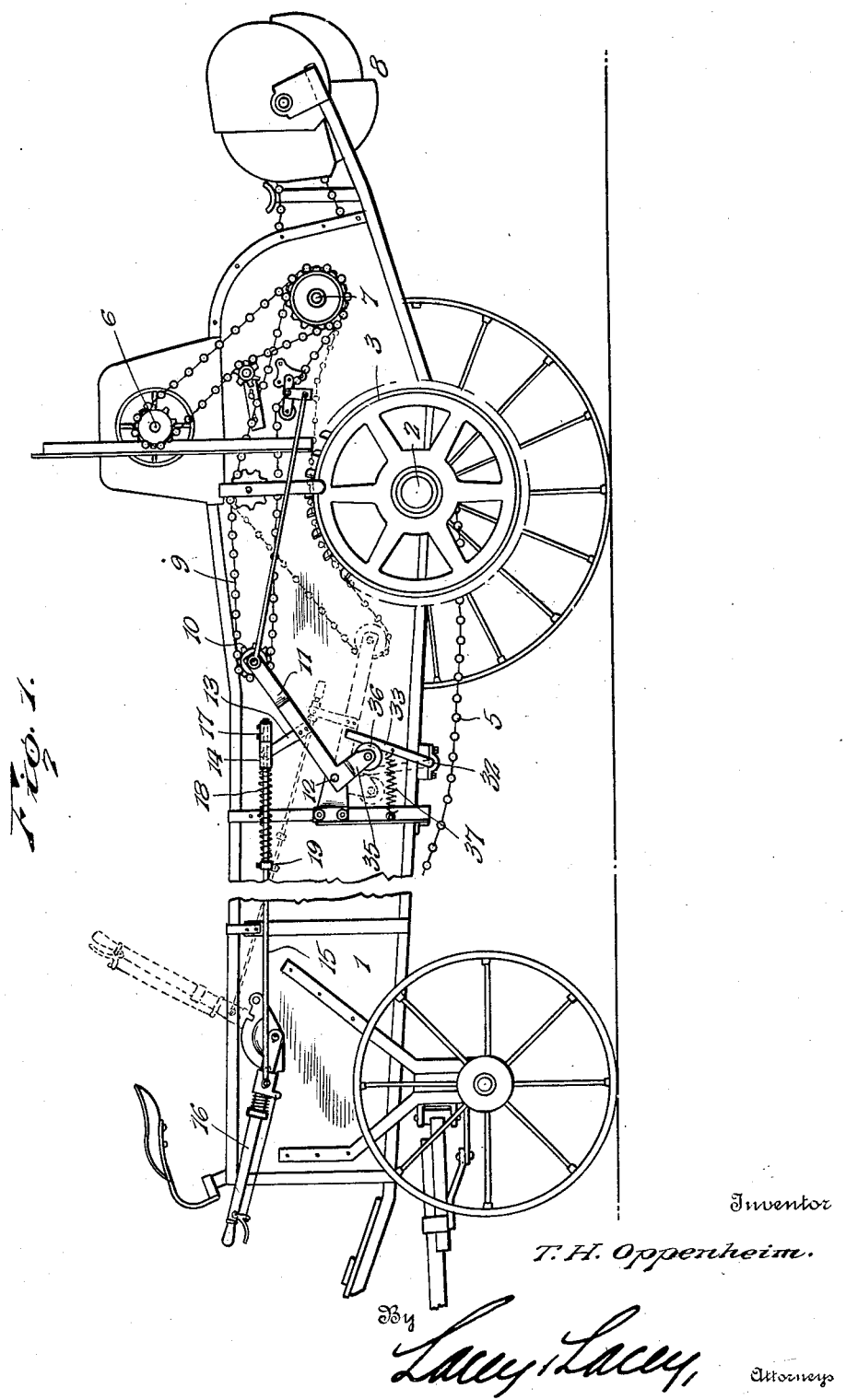
Inventor
T. H. Oppenheim.
By Lacey & Lacey, Attorneys April 19, 1932. T. H. OPPENHEIM 1,854,599
MANURE SPREADER
Filed Jan. 15, 1930 3 Sheets-Sheet 2
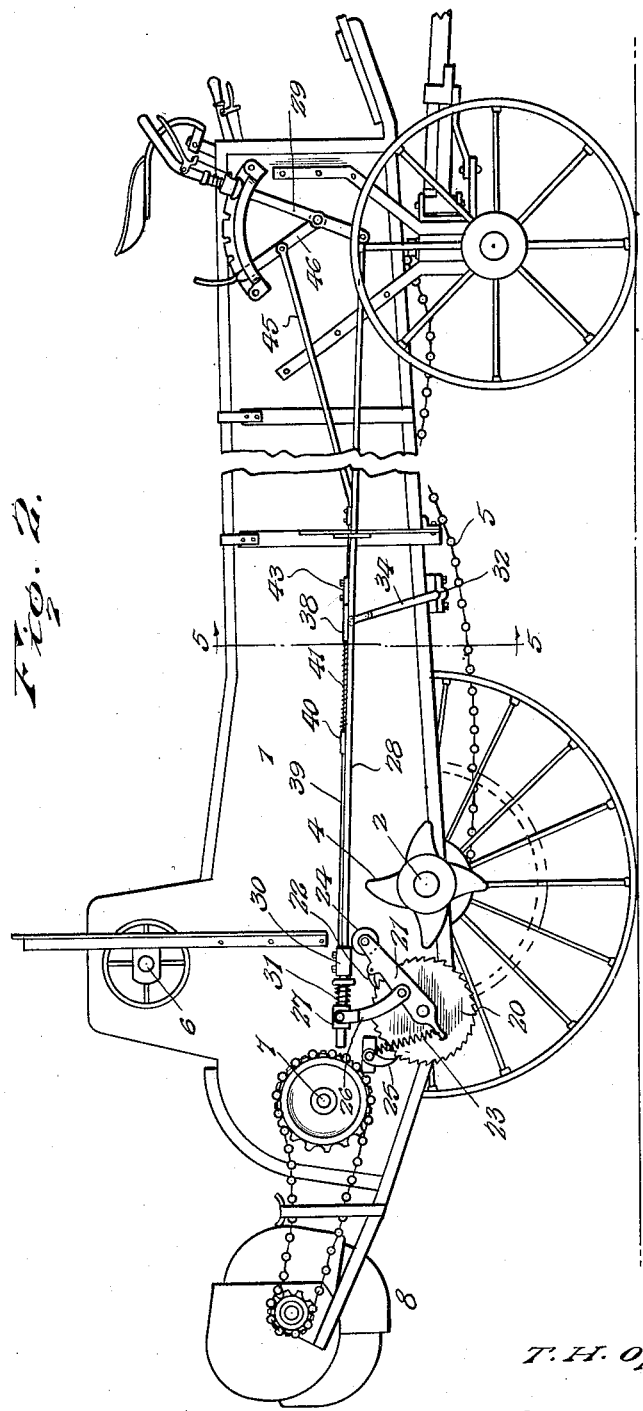
Inventor
T. H. Oppenheim.
By Lacey & Lacey, Attorneys

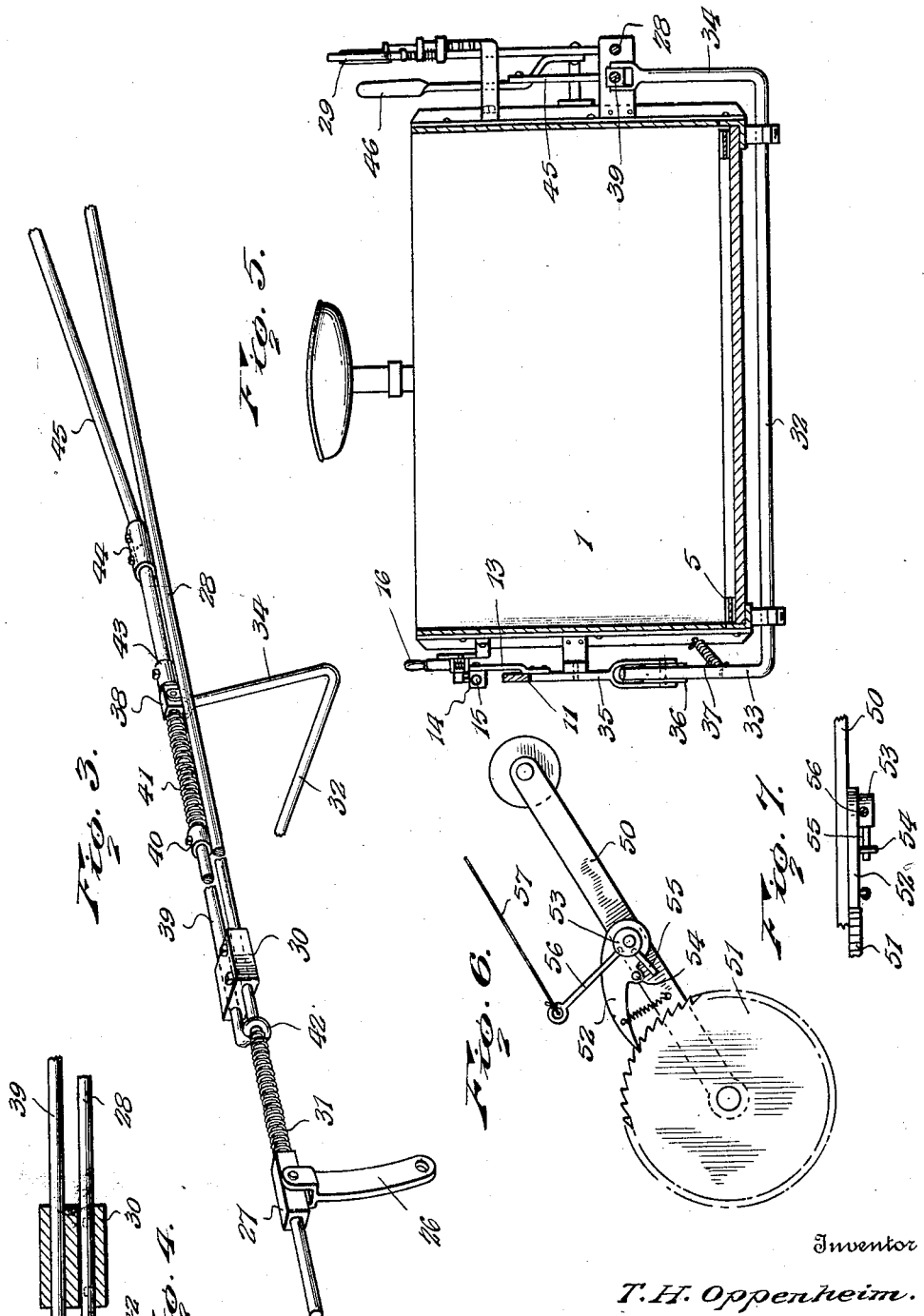

Patented Apr. 19, 1932

1,854,599

UNITED STATES PATENT OFFICE

THEODORE H. OPPENHEIM, OF COLDWATER, OHIO, ASSIGNOR TO THE NEW IDEA SPREADER CO., OF COLDWATER, OHIO, A CORPORATION OF OHIO

MANURE SPREADER

Application filed January 15, 1930. Serial No. 421,022.

Fertilizer distributers and spreaders, as now most generally built, consist of a wagon box in the bottom of which is a rearwardly traveling endless conveyor whereby the load of manure, compost, lime, marl or other material is fed toward the rear end of the box, and mounted in or at the rear end of the box are upper and lower beaters which pulverize the load and feed it rearwardly over onto spreaders by which it is thrown laterally so as to cover a considerable surface of the ground as the wagon is drawn over a field. The beaters and spreaders usually are driven from a sprocket wheel secured upon the rear axle or to the side of one of the rear carrying wheels and the conveyer is given a step by step movement through mechanism on the opposite side of the wagon box, the primary moving part of which is a cam upon the rear axle. The feeding mechanism and the distributing mechanism are controlled independently through hand levers at the front of the box and mounted on the opposite sides of the same. It frequently happens that before the entire load has been distributed the end of the field has been reached and the driver stops the operation of the beaters and spreaders but forgets to stop the action of the conveyer or feeding belt, the result being that the load is carried rearward to the beaters which are inactive and is piled up against the beaters so that the entire mechanism is choked and parts of the machinery may be broken. When the machine has been turned to make a return trip over the field or it is attempted to drive the machine from the field, under such conditions, it is found that the rear ground wheels will not rotate and merely slide upon the ground, and in order to restore the parts to an operative condition the driver must operate a rake or fork or other implement so as to clear the load from the beaters in order to permit the beaters to rotate. It also sometimes happens that the load is practically fully distributed before the operator notices the condition and the small quantity which is left upon the conveyer is carried to the beaters but, as the small quantity of load left does not furnish sufficient resistance to the beaters, it is merely thrown back into the wagon box and is not distributed. The present invention, therefore, has for one object the provision of means whereby when the operation of the beaters is stopped the action of the feeder will also be automatically arrested, and another object is to provide means whereby the feeder may be operated while the beaters are inactive. These stated objects, and other objects which will incidentally appear in the course of the following description, are attained in such an apparatus as is illustrated in the accompanying drawings, and the invention resides in certain novel features which will be particularly pointed out in the appended claims.

In the drawings:

Figure 1 is a side elevation of a manure spreader embodying the invention and showing the mechanism for driving the beaters and spreaders, Fig. 2 is a similar view showing the opposite side of the machine, Fig. 3 is an enlarged detail perspective view of a portion of the feed-controlling mechanism embodying the present invention, Fig. 4 is an enlarged horizontal section of a portion of the mechanism shown in Fig. 3, Fig. 5 is a somewhat enlarged transverse section on the line 5—5 of Fig. 2, Fig. 6 is a detail side view showing a modification, and Fig. 7 is a detail plan view of the mechanism shown in Fig. 6.

Referring more particularly to the drawings, there is shown a wagon box 1 mounted upon front and rear ground wheels and having the rear axle 2 equipped at one side with a driving sprocket 3 and at the opposite side with a multiple cam 4. An endless conveyer 5 is mounted in the bottom of the wagon box to travel rearwardly over the floor of the same and feed the load toward the beaters and spreaders, the upper and lower beater shafts being indicated at 6 and 7, respectively, and the spreaders being shown at 8. In the illustrated arrangement, the beaters are driven from the main sprocket wheel 3 through a sprocket chain 9 which is trained about a sprocket gear upon one of the beater shafts and is adapted to have its lower run engaged with the main sprocket so as to transmit the motion to the working parts. The upper and lower runs of this chain are mounted upon idlers so that it will be supported in the inoperative position and its front bight is trained about a sprocket 10 carried by the upper end of a rocking arm or lever 11 which is fulcrumed upon the side of the wagon box, as shown at 12. It will be understood at once that when the rocking arm 11 is swung downwardly to the position shown by dotted lines in Fig. 1 the chain will be engaged with the driving sprocket 3 and the parts will operate while, if the rocking arm be swung upwardly to the position shown in full lines, the beaters and spreaders will be thrown out of action. A front arm 13 is fixed to or formed integral with the rocking arm 11 and extends upwardly and forwardly therefrom to have its free end pivoted upon a collar 14 which is loosely mounted upon a control rod 15 slidably supported upon the side of the wagon box in any approved manner and pivoted at its front end to a hand lever 16 whereby the rocking arm may be adjusted, said lever 16 being equipped with the usual latch whereby it may be held in a set position, as indicated in Fig. 1. Upon the rear extremity of the rod 15 is a set collar 17 against which the loose collar 14 may abut and in front of the loose collar 14 is an expansion spring 18 disposed around the rod and bearing against the collar 14 and against an abutment 19 on the rod. If the lever be swung forward, the collar 17 will be brought against the loose collar 14 and the rocking arm 11 swung forwardly. If the lever 16 be swung rearwardly, the collar 17 will move away from the loose collar 14 but the spring 18 will follow up the movement so that the collar 14 will also be moved rearwardly and the rocking arm swung downwardly, the spring absorbing the shock caused by the engagement of the sprocket chain with the driving sprocket and thereby preventing breaking of any of the chain links or the sprocket teeth, and also exerting a tension which avoids vibration in the driving arm and maintains the chain taut on the drive sprocket.

On the opposite side of the machine at the rear of the driving cam 4, there is mounted a ratchet wheel 20 and disposed concentric with said wheel is a lever 21 carrying a pawl 22 which engages the teeth of the ratchet wheel. A spring 23 holds the lever 21 toward the cam 4 so that as the cam rotates the lobes of the same will engage the free end of the lever 21, or a roller 24 mounted thereon, so that the lever will be rocked and the ratchet wheel given a step by step movement. The ratchet wheel is fastened to the rear shaft or drum of the feeding conveyer so that the conveyer will thus be operated.

A dog 25 engages the ratchet wheel 20 to prevent retrograde movement of the same and an arm 26 is secured to and extends upwardly from the lever 21 and carries a collar or sleeve 27 which encircles a rod 28 slidably supported upon the side of the wagon box and connected at its front end to the lower end of a hand lever 29, the lever being equipped with the usual latch for holding it in a set position, as indicated in Fig. 2. An abutment 30 in the form of a block secured to the rod 28 by set screws, as shown, is disposed in advance of the collar or sleeve 27 and a spring 31 is coiled around the rod between the block 30 and said sleeve 27, as shown. If the lever 29 be swung forwardly, its lower end will move rearwardly and the rod 28 will, consequently, be carried backward so that the abutment or block 30 will compress the spring 31 and thereby impart a rearward movement to the sleeve 27 whereby the lever 21 will be rocked upward and its free end carried beyond the range of the cam 4 so that the feeding mechanism will be inactive. It will thus be seen that the control of the feeding mechanism is independent of the control of the beating and spreading devices and this independence in action is desirable in order to properly regulate the operation, but, as has been previously explained, there is a disadvantage which it is the object of the present invention to overcome.

In carrying out the present invention, a rock shaft 32 is mounted transversely of the wagon box at any preferred point, being shown below the fulcrum of the rocking arm 11, upstanding cranks 33 and 34 being provided at the ends of the rock shaft. The rocking arm 11 is provided at its lower end with a lateral extension 35 having a roller 36 at its free end so disposed that it will ride upon the crank arm 33 and thereby rock the shaft 32, a retractile spring 37 attached to the crank arm 33 and to the wagon box serving to maintain the engagement between the crank and the roller. When the rocking arm 11 is swung downwardly to permit operation of the beaters and cooperating parts, the roller 36 and the extension 35 swing forwardly and the crank 33, of course, follows the movement and, likewise, when the rocking arm 11 is swung upwardly to stop the action of the beaters the extension 35, with the roller 36, swings rearwardly and acts upon the crank 33 to rock the shaft 32. At the opposite side of the machine, the crank 34 is pivoted at its upper end to a sleeve or collar 38 loose on a rod 39 which is disposed adjacent the rod 28 and at the inner side of the same, a fixed abutment 40 being provided upon said rod at the rear of the sleeve 38 and an expansion spring 41 being disposed about the rod between said abutment and sleeve. The rear end portion of the rod 39 is slidably mounted in and passes through the inner portion of the block 30 and the rear extremity of the rod 39 is turned laterally and formed into an eye 42 encircling the rod 28 between the spring 31 and the abutment block 30, as shown most clearly in Fig. 4. When the beaters are thrown out of action, they will be held out of action until the latch on the lever 16 is released, as will be understood on reference to Fig. 1. As the shaft 32 is rocked, as described, in throwing the beaters out of action, the crank 34 swings rearwardly and the sleeve or collar 38 follows the movement so that the spring 41 will be compressed and the rod 39 thereupon shifted rearwardly. This rearward movement of the rod 39 will compress the spring 31 and, through the spring, act upon the sleeve 27 and the arm 26 to rock the lever 21 out of operative relation with the cam 4 so that the feeding action will also be stopped. Choking of the beaters will, consequently, be avoided, even if the operator forgets to manipulate the hand lever 29.

The rod 39 is slidably supported upon the side of the wagon box in any approved manner and upon the said rod in advance of the loose sleeve 38 is secured to stop collar 43 to limit the forward movement of the loose sleeve 38. To the front extremity of the rod 39 is connected, by a coupling 44, a pitman 45 which extends forwardly and is pivoted to a supplemental hand lever 46 having its fulcrum in common with the fulcrum of the hand lever 29. Should there be a slight amount of material left upon the feeding conveyer when the action of the beaters is stopped, the operator throws the hand lever 29 rearward, pulling the rod 28 forward, and may then rock the lever 46 forward, pulling the rod 39 forward and compressing the spring 41 against the collar 38. The crank 34, however, will not rock forward as the crank 32 is held against such movement by the arm 35, as shown by the dotted lines in Fig. 1. When the rod 39 moves forward, the lever 21 is permitted, of course, to drop onto the cam. When the bed is cleaned out, the levers 29 and 46 are restored to their former positions, returning the pawl-carrying lever to the out position.

From the foregoing description, taken in connection with the accompanying drawings, it will be seen that I have provided a very simple operative connection between the means for controlling the distributing mechanism and the means for controlling the feed so that whenever the beaters are thrown out of action the feed will be automatically arrested. At the same time it is possible when the beaters are not working to actuate the feeder so that any slight remnants of the load may be discharged.

It is to be understood that the invention is not limited to the specific embodiment which has been described and is illustrated in Figs. 1 to 5 of the drawings and that various means may be provided for automatically stopping the feed when the beaters stop. In Figs. 6 and 7, I have illustrated one variation which may be employed and in these figures the numeral 50 indicates the rocking arm or lever which is actuated by the cam to effect rotation of the ratchet wheel 51. The pawl 52 is not pivoted directly upon the side of the lever 50 but is carried by an eccentric 53 which is pivotally mounted in the lever and projects therefrom, as will be understood. A stud 54 is provided on the side of the pawl and a pin 55 extends radially from the eccentric so that if the eccentric be rocked the pin will be carried against the stud and the pawl swung out of operative relation to the ratchet wheel. A crank 56 extends upwardly from the eccentric and to the free end of this crank a rod or other connection 57 extends to the lever for controlling the driving mechanism or to the crank 34 so that when the driving of the beaters stops the feeder will also be stopped through the disengagement of the pawl 52 from the ratchet wheel. Various other modifications or embodiments of the invention may be devised without departing from the spirit or scope of the invention as the same is defined in the following claims.

Having thus described the invention, I claim:

1. In a spreader including means for distributing a load, and means for feeding the load to the distributing means together with means for independently controlling the distributing means and the feeding means, operative devices actuated by the means for controlling the distributing means to automatically arrest the movement of the feeding means when the distributing means is rendered inactive, said devices having lost-motion connection with the means for controlling the feeding means whereby the feeding means may be actuated while the distributing means is inactive.

2. In a spreader comprising a wagon box, means to distribute a load, means for feeding a load to the distributing means, means on one side of the box to control the distributing means, and means on the other side of the box to control the feeding means, a rock shaft mounted on the bottom of the wagon box, a crank arm at one end of said shaft arranged to be actuated by the means for controlling the distributing means, and a crank at the opposite end of said shaft operatively connected with the means for controlling the feeding means whereby when the distributing means are rendered inactive the feeding means will be stopped.

3. In a spreader including means for distributing a load, and means for feeding the load to the distributing means, a rocking arm controlling the distributing means, an extension on the lower end of said rocking arm, a rock shaft disposed transversely and below said rocking arm, a crank at one end of said shaft operatively engaged by the extension on the rocking arm, a crank at the opposite end of the rock shaft, and means connected with the last-mentioned crank to arrest the action of the feeding means.

4. In a spreader, the combination with means for distributing a load, and means for feeding a load to the distributing means, of means at one side of the machine for controlling the distributing means, a rock shaft actuated by said controlling means when the distributing means is rendered inactive, a slidably mounted rod at the opposite side of the machine, connections between said rod and the rock shaft, means whereby said rod will stop the feeding means when actuated by the rock shaft, and means for independently operating said rod to actuate the feeding means while the distributing means is held inoperative.

5. In a spreader having means for distributing a load, and means for feeding a load to the distributing means, means for controlling the distributing means, a rock shaft actuated by said controlling means, means for controlling the feeding means including a rocking lever, an arm extending therefrom and a sleeve carried by said arm, and a slidably supported rod connected with the rock shaft and having its rear end arranged to engage said sleeve whereby to throw the feeder actuating mechanism into an inactive position.

6. In a spreader, the combination with feeder-actuating means including a rod connected therewith to move the same to inactive position, and distributer operating means including a rocking arm controlling said means, of a rock shaft disposed transversely of said means and arranged to be actuated by the rocking arm, and a rod connected with the rock shaft and slidably supported upon the first-mentioned rod and adapted to set the feeder-actuating means in inoperative position.

7. In a spreader, the combination with load-feeding means, and means including a reciprocatory rod for throwing said feeding means into inactive position, of a supplemental rod, means connected with said rod for automatically stopping the action of the feeding means, and means for slidably supporting the supplemental rod upon the first-mentioned rod whereby the supplemental rod may be set to permit actuation of the feeding means.

8. In a spreader having means for distributing a load and means independent of said means for feeding a load to the distributing means, means whereby the feeding means will be automatically stopped when the distributing means is rendered inactive, and auxiliary means to set the feeding means in operative position while the distributing means is inoperative.

9. In a spreader, the combination with means for distributing a load and means for feeding a load to the distributing means, of means at one side of the machine for controlling the distributing means, a control rod at the opposite side of the machine operatively connected with the feeding means, means for yieldably operating said control rod, a rock shaft arranged to be actuated by the means for controlling the distributing means, a block secured on said control rod, an auxiliary rod slidably mounted in said block and having one end slidably engaged with the control rod, yieldable means whereby pressure may be exerted by said end of the auxiliary rod, a crank on the rock shaft pivoted to said sleeve, abutments on the auxiliary rod at the front and rear of said sleeve, a spring between said sleeve and the rear abutment, and means for actuating the auxiliary rod independent of the rock shaft.

In testimony whereof I affix my signature.

THEODORE H. OPPENHEIM. [L. S.]